United States Patent
Tran et al.

(10) Patent No.: US 12,100,018 B2
(45) Date of Patent: Sep. 24, 2024

(54) PRODUCTION AND LOGISTICS MANAGEMENT

(71) Applicants: Bao Tran, Saratoga, CA (US); Ha Tran, Saratoga, CA (US)

(72) Inventors: Bao Tran, Saratoga, CA (US); Ha Tran, Saratoga, CA (US)

(73) Assignee: Cenports, Inc., Hayward, CA (US)

(*) Notice: Subject to any disclaimer, the term of this patent is extended or adjusted under 35 U.S.C. 154(b) by 0 days.

(21) Appl. No.: 17/824,009

(22) Filed: May 25, 2022

(65) Prior Publication Data
US 2022/0343275 A1 Oct. 27, 2022

Related U.S. Application Data

(63) Continuation of application No. 16/574,931, filed on Sep. 18, 2019, now Pat. No. 11,429,991.

(51) Int. Cl.
*G06Q 30/0204* (2023.01)
*G06N 3/08* (2023.01)
(Continued)

(52) U.S. Cl.
CPC ........... *G06Q 30/0205* (2013.01); *G06N 3/08* (2013.01); *G06Q 10/0831* (2013.01);
(Continued)

(58) Field of Classification Search
CPC ........... G06Q 10/0834; G06Q 30/0201; G06Q 30/0202; G06Q 30/0205; G06Q 30/0605; G06Q 30/0643; G06Q 10/087; G06N 3/08
See application file for complete search history.

(56) References Cited

U.S. PATENT DOCUMENTS 7,020,623 B1 * 3/2006 Tiley ................. G06Q 30/0253
705/14.69
10,176,405 B1 * 1/2019 Zhou ..................... G06T 7/246
(Continued)

FOREIGN PATENT DOCUMENTS

| CN | 108124252 A | * | 6/2018 | ........... H04L 41/069 |
| KR | 20200024404 A | * | 3/2020 | ......... G06Q 30/0631 |
| WO | WO-2020113900 A1 | * | 6/2020 | ........... G06Q 20/065 |

OTHER PUBLICATIONS

"Demand Forecasting for Server Manufacturing Using Neural Networks", by Chanchai Saha, IBM, Proceedings of the 2014 Industrial and Systems Engineering Research Conference. Nov. 13, 2015. (Year: 2015).*

(Continued)

*Primary Examiner* — Pan G Choy
(74) *Attorney, Agent, or Firm* — PatentPC; Bao Tran

(57) ABSTRACT

Systems and methods are disclosed for providing a product to consumers by receiving the product from a manufacturer located in a first country; matching the products with a seller in the second country; managing delivery logistics by matching available third-party truckers and third-party warehouses in a second country based on proximity; forecasting demand using one or more neural networks for the manufacturer, the logistics organization, and the warehouses; and managing logistics for the manufacturer through a dashboard populated by the forecasted demand from the one or more neural networks.

15 Claims, 7 Drawing Sheets

(51) Int. Cl.
   *G06Q 10/0831* (2023.01)
   *G06Q 10/0834* (2023.01)
   *G06Q 10/087* (2023.01)
   *G06Q 30/0201* (2023.01)
   *G06Q 30/0202* (2023.01)
   *G06Q 30/0601* (2023.01)

(52) U.S. Cl.
   CPC ....... *G06Q 10/0834* (2013.01); *G06Q 10/087* (2013.01); *G06Q 30/0201* (2013.01); *G06Q 30/0202* (2013.01); *G06Q 30/0605* (2013.01); *G06Q 30/0643* (2013.01)

(56) References Cited

U.S. PATENT DOCUMENTS

| | | | | |
|---|---|---|---|---|
| 10,579,869 | B1* | 3/2020 | Xiong | G06N 3/088 |
| 2002/0069263 | A1* | 6/2002 | Sears | G06F 9/445 |
| | | | | 709/218 |
| 2004/0186795 | A1* | 9/2004 | Taylor, Sr. | G06Q 10/10 |
| | | | | 705/29 |
| 2005/0267791 | A1* | 12/2005 | LaVoie | G06Q 10/063 |
| | | | | 705/7.31 |
| 2006/0085246 | A1* | 4/2006 | Li | G06Q 30/0202 |
| | | | | 705/7.31 |
| 2006/0095331 | A1* | 5/2006 | O'Malley | G06Q 20/20 |
| | | | | 705/22 |
| 2012/0095930 | A1* | 4/2012 | Rider | G06Q 30/018 |
| | | | | 705/317 |
| 2014/0006101 | A1* | 1/2014 | Andrade | G06Q 30/0201 |
| | | | | 705/7.29 |
| 2014/0032378 | A1* | 1/2014 | Damnjanovic | G06Q 30/0623 |
| | | | | 705/28 |
| 2014/0350991 | A1* | 11/2014 | Kersh | G06Q 30/0202 |
| | | | | 705/7.31 |
| 2016/0260133 | A1* | 9/2016 | Chen | G06Q 30/0259 |
| 2017/0004444 | A1* | 1/2017 | Krasko | G06Q 10/0833 |
| 2017/0316362 | A1* | 11/2017 | Goss | G06Q 10/06313 |
| 2018/0114264 | A1* | 4/2018 | Rafii | G06Q 30/0643 |
| 2018/0176483 | A1* | 6/2018 | Knorr | H04N 23/80 |
| 2018/0276695 | A1* | 9/2018 | Dione | G06Q 10/08 |
| 2019/0147296 | A1* | 5/2019 | Wang | G06F 18/2148 |
| | | | | 382/157 |

OTHER PUBLICATIONS

"Demand Forecasting Using Neural Network for Supply Chain Management", by Ashvin Kochak and Suman Sharma, International Journal of Mechanical Engineering and Robotics Research, vol. 4, No. 1, Jan. 2015. (Year: 2015).*

"A decision support system for demand forecasting with artificial neural networks and neuro-fuzzy models: A comparative analysis", by Tugba Efendigil, Semih Onut and Cengiz Kahraman, Expert Systems with Applications 36 (2009) 6697-6707. (Year: 2009).*

* cited by examiner

FIG. 1A

| |
|---|
| Receiving the product from a manufacturer located in a first country (10) |
| Matching the products to a seller in the second country (12) |
| Managing delivery logistics by matching available third-party truckers and third-party warehouses in a second country based on proximity (14) |
| Managing workflow for the manufacturer and logistics companies through a dashboard populated by a neural network (16) |

FIG. 1B

| |
|---|
| Receiving a product specification from a seller (20) |
| Locating manufacturers capable of producing the product and place orders for the product (22) |
| Optionally obtaining financing for qualified manufacturers (24) |
| Managing delivery logistics by matching available third-party truckers and third-party warehouses based on proximity (26) |
| Delivering the products to the seller in the second country (28) |
| Managing workflow for the manufacturer/logistics company through a dashboard populated by a neural network (30) |

FIG. 1C

| |
|---|
| Receiving the product from a manufacturer located in a first country (40) |
| Listing the product through one or more ecommerce sites (42) |
| Receiving orders from customers in a second country from the ecommerce sites (44) |
| Managing delivery logistics by matching available third-party truckers and third-party warehouses in the second country based on proximity (46) |
| Managing workflow for the manufacturer/logistics company through a dashboard populated by a neural network (48) |

FIG. 1D

| |
|---|
| Receiving a product specification from a seller (50) |
| Locating manufacturers capable of producing the product and place orders for the product (52) |
| Applying a neural network to review qualifications based on sales data and combine with asset data to obtain financing for qualified manufacturers (54) |
| Managing delivery logistics by matching available third-party truckers and third-party warehouses based on proximity (56) |
| Delivering the products to the seller in the second country (58) |
| Managing workflow for the manufacturer/logistics company through a dashboard populated by a neural network (60) |

FIG. 2

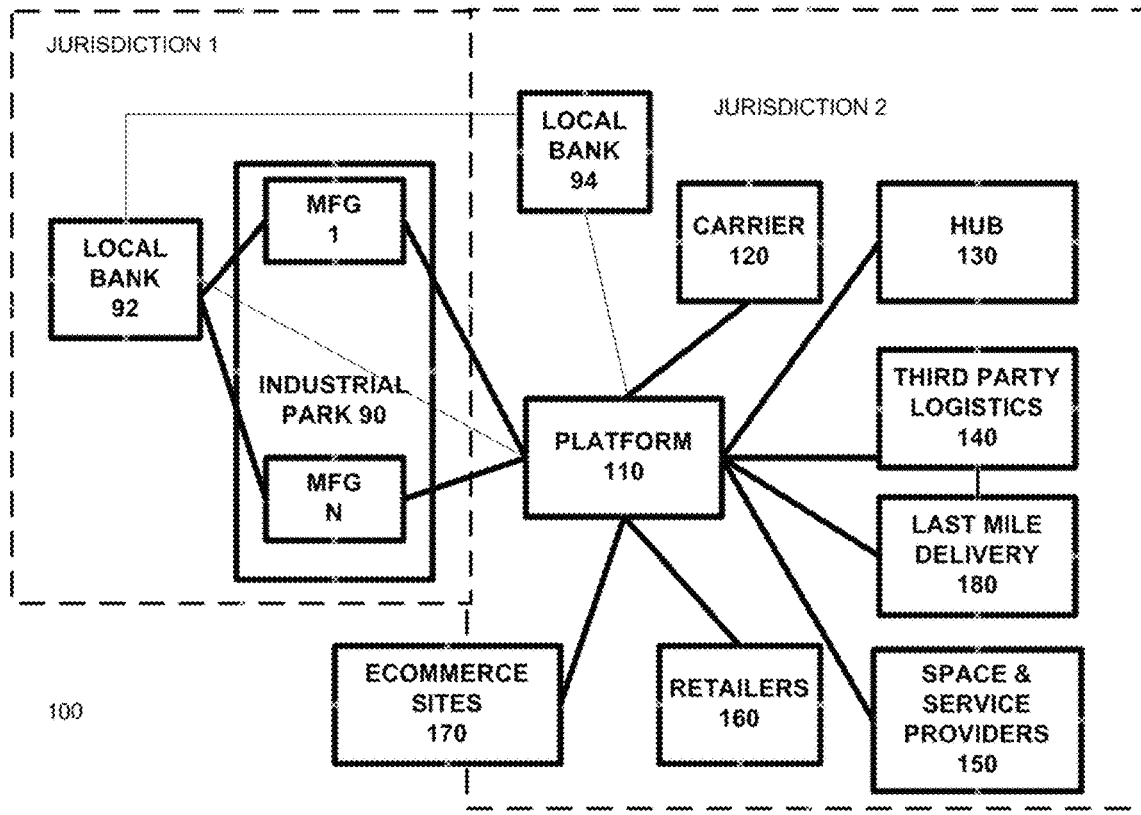

FIG. 3

| |
|---|
| Customer selects product(s) to purchase on an ecommerce merchant website (or native mobile app, mobile web) (302) |
| Customer chooses a payment method (e.g., debit card, credit card, checking account) and enters delivery information (304) |
| Customer reviews the order details and then clicks on the "Buy" button (306) |
| Ecommerce website generates and sends an order that includes the order details (308). |
| Order data is received and parsed by the demand-forecasting service (310) |
| Demand forecast for the manufacturer and the logistics company is updated (312) |
| Check if the items are from a single company or from multiple vendors (312) |
| If items are from different manufacturers, the system identifies the items from warehouse locations (314) |
| System packages at least two items from different manufacturers (316) |
| System ships the items from different vendors in one package to the customer (318) |

FIG. 4

| |
|---|
| Manufacturer transmits a 3D model of the product to Platform (402) |
| Potential Buyer uses a smart phone or AR to calibrate and measure dimensions of his/her environment (404) |
| 3D model is scaled to the dimensions of the buyer environment (406) |
| Scaled 3D model is superimposed on the viewport of the smartphone/AR device to allow user to see how well the product works as intended (408) |
| Buyer provides feedback and suggestions to Platform, including drawings and pictures, which are then sent to Manufacturer as a shared IP owned by Platform and Manufacturer for product improvement (410) |

FIG. 5

| |
|---|
| Platform receives a plurality of orders, each including a plurality of manufacturing/logistic data elements, in real-time, near real-time, or periodically (502) |
| Orders are analyzed to aggregate the manufacturing and logistics data elements (504) |
| A neural network trained as a demand forecasting analytics model is applied to the aggregated manufacturing/logistic data elements (506) |
| The neural network determines a demand forecast, indicating an upcoming demand for production and transportation assets within the product supply chain (508) |
| The neural network provides the manufacturing demand forecasting to the manufacturer and the logistic demand forecasting to the logistics organization (510) |

FIG. 6A

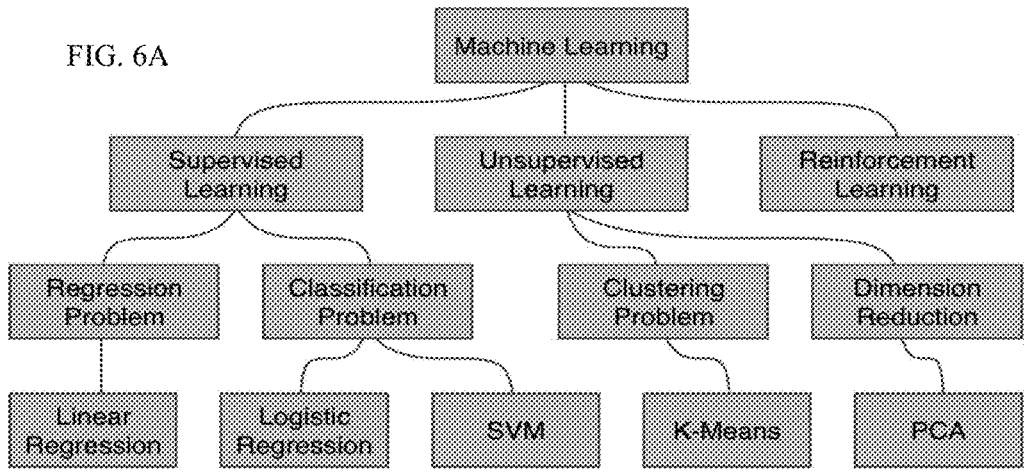

PRODUCTION AND LOGISTICS MANAGEMENT

TECHNICAL FIELD

The subject matter described herein relates to a platform to assist companies in providing high quality products to consumers.

BACKGROUND

As trade opportunities open across the globe, customers and nations have changed the nature of their demands. Exporting products and shipping goods abroad involve a degree of "calculated risk taking." With the expansion of globalization, doing business across borders has become more sophisticated. Once the primary barrier such as taxes and tariffs imposed by the country of destination has been overcome, quality, timeliness, and visibility now come to the picture. It used to be enough that merchandise arrived on schedule. Today, everything needs to be in sync, and in perfect condition. With the development of outsourced manufacturing industries around the world, accountability is more complex. The main issues in exports for small and middle companies include:

Lack of knowledge in the market.
Unawareness of the mechanics behind exports.
Lack of knowledge about their counterparts
Lack of compliance it times and sizes of deliveries.
Impatience from managers who do not see immediate results.

The main challenges of the exporting manufacturers may include the following: 1. Risk of stock loss or damage when working with multiple suppliers; 2. Speed and trust in deliveries; 3. Skill in customs management; 4. Clear and transparent processes across the chain; 5. The cultural barrier; 6. Currency Volatility; 7. Efficiency; 8. Financing; and 9. Lack of Local Sales Channel Risk of stock loss/damage can be significant. International logistics involves several actors within 3PL. There are details like packaging, nature of the merchandise, the urgency of the delivery and the degree of manipulation across the supply chain. These can raise doubts in any trade manager when it comes to assessing the quality of their products arriving at the destination.

As to the speed and trust in deliveries, export managers and international logistics companies don't just juggle time zones and ETAs, or trivial details such as the tides and winds in shipping. Confidence in the state of the delivery from 3PL companies is essential when goods are delicate, and they take part of a larger manufacturing process. When importers become an ally on their customer's value chain, they must have clockwork precision. These factors can mark the success of failure of a business relationship.

Customs management skills are vital. In addition to the speed of cargo consolidation, bonded warehousing managers need to handle quality assurance processes, taxes, and fees. It takes one document with a typo or a wrong SKU code to have an entire shipment delayed by mistake, or demanding for the wrong tariffs.

Transparency across the supply chain is important. The amount of information that an imports manager receives in each morning is tremendous. They multiple operations at the same time, but problems occur if the product is correct, but labeled incorrectly. For instance, Mexico requires labeling for goods specifying the country of origin, the name of the importer, expiration dates, and details such as whether the products can be sold separately or in a package.

Cultural barriers often affect sales. The exporter must become a diplomat, and even if they hurry to meet deadlines, they must take the time to study the country they ship to or bring their goods. It may take time to build and maintain relationships with clients and distributors. In some cases, there can be a significant language barrier.

Currency management and foreign exchange (forex) costs are also important. The dollar, yen or sterling pound rises and falls. This impacts exports and imports right away. It is not uncommon that while shipments are halfway between Europe or Asia, their value increases or decreases. Or that, due to a sudden problem in cash flow, an importer is forced to keep hundreds of units for extra days or weeks at a bonded warehouse. Further, banks involved in the transaction can charge forex fees.

Companies with good management can compress cycle times and squeeze costs out of their supply chains, says Inbound Logistics. However, those that don't can get with penalties, fines, and bottlenecks. If the import of one shipment involves a dozen parties, the chain of events triggered if just one of those parties fails to meet its commitments can lead to failure.

Financing can also affect the manufacturer. For a mid size company, receiving a large order is good news, but the manufacturer may not be able to finance the order.

Lack of Local Sales Channel is often the major reason why companies with great products fail in a new market.

SUMMARY

Variations of the present subject matter are directed to methods, systems, devices, and other articles of manufacture that are provided to assist the efficient movement of goods from production to the consumer.

In one aspect, systems and methods are disclosed for providing a product to consumers by receiving the product from a manufacturer located in a first country; matching the products with a seller in the second country; managing delivery logistics by matching available third-party truckers and third-party warehouses in a second country based on proximity; forecasting demand using one or more neural networks for the manufacturer, the logistics organization, and the warehouses; and managing logistics for the manufacturer through a dashboard populated by the forecasted demand from the one or more neural networks.

Another process includes receiving the product from a manufacturer located in a first country; matching the products to a seller in the second country; managing delivery logistics by matching available third-party truckers and third-party warehouses in a second country based on proximity; and managing workflow for the manufacturer and logistics companies through a dashboard populated by a neural network.

Yet another process includes receiving a product specification from a seller; locating manufacturers capable of producing the product and place orders for the product; optionally obtaining financing for qualified manufacturers; managing delivery logistics by matching available third-party truckers and third-party warehouses based on proximity; delivering the products to the seller in the second country; and managing workflow for the manufacturer/logistics company through a dashboard populated by a neural network.

Yet a further process includes receiving the product from a manufacturer located in a first country; listing the product through one or more ecommerce sites; receiving orders from customers in a second country from the ecommerce sites; managing delivery logistics by matching available third-party truckers and third-party warehouses in the second country based on proximity; and managing workflow for the manufacturer/logistics company through a dashboard populated by a neural network.

Another process includes receiving a product specification from a seller; locating manufacturers capable of producing the product and place orders for the product; applying a neural network to review qualifications based on sales data and combine with asset data to obtain financing for qualified manufacturers; managing delivery logistics by matching available third-party truckers and third-party warehouses based on proximity; delivering the products to the seller in the second country; and managing workflow for the manufacturer/logistics company through a dashboard populated by a neural network.

In some implementations, actions include receiving a plurality of orders, where each electronic receipt includes manufacturing and logistic data elements, parsing the orders to aggregate the manufacturing and/or logistic data elements, processing the aggregated logistic data elements through a demand forecasting analytics model, the demand forecasting analytics model having been trained using a set of training data including historic and actual demand within a logistic supply chain, determining a manufacturing forecast, the manufacturing forecast indicating an upcoming demand for production, and determining a logistics forecast for labor or transportation assets within the logistic supply chain. Other implementations of this aspect include corresponding systems, apparatus, and computer programs, configured to perform the actions of the methods, encoded on computer storage devices.

The above system provides many advantages. For example, by providing a platform that integrates manufacturing and logistics information, efficiencies and capacity utilization of various providers can be improved. As another example, by providing businesses that operate in the hub's ecosystem with trusted real-time information, efficient process automation can be achieved.

With respect to logistics, by providing location-based services for all participants (stakeholders) in the logistics operations, the system can provide, for example, smooth shipping, efficient terminal operations, reduced wait times for container pickup, efficient parking, real-time traffic management, smooth traffic flow, real-time and efficient freight forwarding, efficient container operations, ETA of vehicles, etc. Members of the hub benefit from knowing about the logistic demand and requirements as soon as purchases are made to allow for increased accuracy and precision in forecasting upcoming asset and labor needs. Additionally, the total quantity of orders being shipped from a specific retailer and the total amount of shipping and handling cost for that specific retailer can be used by a member in the chain to offer incentives to use its services. The demand forecasting for manufacturers and logistics partners provides for increased accuracy regarding asset and labor projection, and is determined based on multiple data sources with highly relevant data points. Example data sources include orders, and are received and processed in real-time, near real-time or periodically, and can be combined with internal data and traditional data sources.

The present disclosure also provides a computer-readable storage medium coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that methods in accordance with the present disclosure can include any combination of the aspects and features described herein. That is, methods in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

BRIEF DESCRIPTION OF THE FIGURES

FIGS. 1A-1D show exemplary processes to enable multi jurisdictional commerce that provides high quality, low cost products to consumers.

FIG. 2 is a diagrammatic illustration of an example of a web-based commerce environment.

FIG. 3-5 shows exemplary processes supported by the system of FIG. 2.

FIGS. 6A-6B show exemplary learning machine details.

DESCRIPTION

Figure 6B:
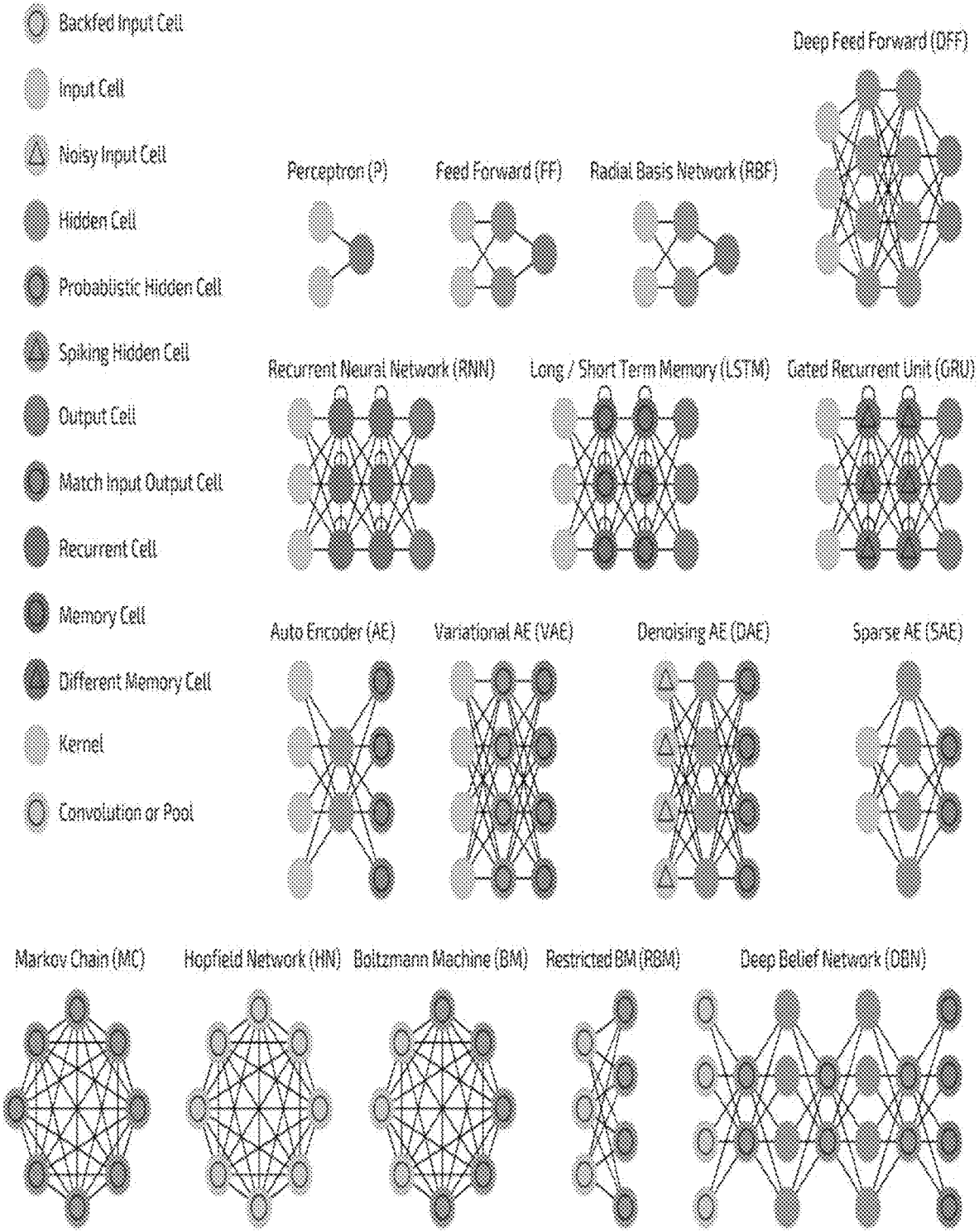

FIG. 1A shows an exemplary process to optimize product manufacturing and delivery to customers. The process includes the following:
- receiving the product from a manufacturer located in a first country (10)
- matching the products to a seller in the second country (12)
- managing delivery logistics by matching available third-party truckers and third-party warehouses in a second country based on proximity (14)
- managing workflow for the manufacturer and logistics companies through a dashboard populated by a neural network (16).

FIG. 1B shows another exemplary process to optimize product manufacturing and delivery to customers. The process includes the following:
- receiving a product specification from a seller (20)
- locating manufacturers capable of producing the product and place orders for the product (22)
- optionally obtaining financing for qualified manufacturers (24)
- managing delivery logistics by matching available third-party truckers and third-party warehouses based on proximity (26)
- delivering the products to the seller in the second country (28)
- managing workflow for the manufacturer/logistics company through a dashboard populated by a neural network (30).

FIG. 1C shows another exemplary process to optimize product manufacturing and delivery to customers. The process includes the following:
- receiving the product from a manufacturer located in a first country (40)
- listing the product through one or more ecommerce sites (42)
- receiving orders from customers in a second country from the ecommerce sites (44)
- managing delivery logistics by matching available third-party truckers and third-party warehouses in the second country based on proximity (46)
- managing workflow for the manufacturer/logistics company through a dashboard populated by a neural network (48).

FIG. 1D shows another exemplary process to optimize product manufacturing and delivery to customers with financing from learning machine analysis of borrower's ability to pay the loan. The process includes the following:
- receiving a product specification from a seller (50)
- locating manufacturers capable of producing the product and place orders for the product (52)
- applying a neural network to review qualifications based on sales data and combine with asset data to obtain financing for qualified manufacturers (54)
- managing delivery logistics by matching available third-party truckers and third-party warehouses based on proximity (56)
- delivering the products to the seller in the second country (58)
- managing workflow for the manufacturer/logistics company through a dashboard populated by a neural network (60).

The first country is commonly a country with a developing economy where cost is low. The second country is a developed economy with buyers. The system matches the best manufacturers with sales channels and logistics to bring high quality goods to consumers. The process provides an efficient supply system where companies in a low production cost environment can sell products to global consumers with full visibility into the supply chain and planning data such as those required for just-in-time production system. These manufacturers typically have inefficient fulfillment and distribution capabilities with limited sales channels and poor marketing capability that. With the system, manufacturers can focus on cost efficient production of high quality products. The system helps these companies with logistics including trucker/warehouse storage, order/inventory management, and sales and marketing channels, among others.

Turning now to FIG. 2, a distributed commerce system 100 with a web platform 110 is disclosed. The commerce platform 110 is in data communication with one or more of members, for example, carriers 120, hub operators 130, third party logistics (e.g., warehouses and/or terminals) 140, and space and service providers 150. In some variations, carriers 120 can include, for example, sea-based, land-based, or air-based carriers, or any combination thereof. Warehouse, space and service providers 150 can include, for example, warehouses for storing the products as well as tow-truck operators, parking operators, and/or gas stations. Platform 110 is also in communication with retailers 160 such as Macys or LL Beans, for example. Platform 110 can also serve entrepreneurs 170 who are ecommerce merchants with their on-line sales and who need logistics and distribution support. Platform 110 also communicates with last-mile delivery services 180 such as the postal system, UPS, FedEx, and DoorDash who can deliver from a warehouse to a customer.

The platform 110 helps to source and supply high quality products from all over the globe and introduces the products cost-efficiently to consumers. The consumers may be located in another jurisdiction such as a developed region (Europe, Japan, or US, among others). The low cost manufacturers are located in a low cost jurisdiction (such as ASEAN and African countries, for example), yet they can serve customers anywhere using the present system. The Association of Southeast Asian Nations or ASEAN countries include Brunei Darussalam, Cambodia, Indonesia, Laos, Malaysia, Myanmar, Philippines, Singapore, Thailand, and Vietnam, with observer Papua New Guinea.

In one embodiment, manufacturers 1 ... N are located in an industrial park 90 of a first jurisdiction. The manufacturers may be served by a local bank 92 that is legally able to lend money and place liens on assets of the local manufacturers to secure their loans. The local bank 92 can then issues a letter of credit to the platform 110, or alternatively to a bank 94 in a second jurisdiction where consumers are located. The platform 110 or the bank 94 in the second jurisdiction then can supply credit to the manufacturers based on product sales information on the platform. With a secured loan, the borrower manufacturer pledges an asset (such as plant, equipment, stock or vehicles) against the debt. If the debt is not repaid, the lender may claim the secured asset. Unsecured loans do not have collateral, though the lender will have a general claim on the borrower's assets if repayment is not made. Should the borrower become bankrupt, unsecured creditors will usually realize a smaller proportion of their claims than secured creditors. As a consequence, secured loans will generally attract a lower rate of interest. Lenders that make business loans often use a UCC filing to alert other creditors of their security interest in the property of the business. UCC filings may be placed against specific assets, or a blanket UCC filing secures interest in all property. UCC filings may affect the business credit score and may make it more difficult to obtain subsequent financing. Some lenders require principals with 20% or greater ownership in the business to provide a personal guarantee. The personal guarantee allows the lender to attempt to collect the debt from the personal assets of the guarantors. The platform 110 can provide purchase order financing and accepts the purchase order from the company's customer as collateral for the loan. Because the platform 110 has history on the product sales, it can accept the added risk that the order will be completed, delivered and accepted by the company's customer. While the cost is also higher than traditional asset-based borrowing, in some circumstances—based on the profit margin for the company and maintaining or establishing its relationship with the customer—purchase order financing may be cost-effective.

As noted below, a learning system helps the manufacturer plan for production. To help unknown manufacturers who have great products, the platform 110 can arrange for introductions with sellers on its platform and also provide marketing channel development work for the manufacturers. In this manner, the platform 110 enables manufacturers with great products to access and serve global consumers by providing financing, local logistics including trucker/warehouse storage, order/inventory management, and sales and marketing channels.

In one embodiment, commerce site 170 is a firm or individual who conducts business over an electronic network, such as the Internet. Ecommerce merchant(s) provides products and/or services via ecommerce and may operate in all four of the major market segments: business-to-business, business-to-consumer, consumer-to-consumer, and consumer-to-business. Example ecommerce providers include Amazon and the eBay marketplace. When a customer purchases goods and/or services from ecommerce merchant(s) 170, an order, such as order or order data, may be generated and sent to the customer in real-time or near real time. Furthermore, in accordance with implementations of the present disclosure, orders may also be generated and sent to the customer in real-time or near real time when a customer purchase goods and/or services at a tradition brick and mortar stores. For example, an order may be generated and sent when a customer requests to have a product that is purchased at a brick and mortar store delivered to a physical address. In accordance with implementations of the present disclosure, real-time describes actions that can be executed without any intentional delay, taking into account the processing limitations of the example system 110 and any time required to process data.

Alternatively, a marketplace may be organized to present to customers one or more web pages corresponding to respective virtual storefronts of the ecommerce merchants, where each storefront indicates the various offerings of a corresponding merchant. In some embodiments, a marketplace may be implemented via a web services application programming interface (API) rather than as one or more web pages. For example, catalog information, ordering functions and other aspects of a marketplace may be implemented as web services functions that may be invoked by various parties to present items in commerce to customers. Other configurations of e-commerce marketplaces are possible and contemplated.

Upon purchase, the system generates an order or an electronic document acknowledging the purchase of a specified amount of money, goods, etc., which may be sent electronically through, for example, email, a messaging platform, or SMS. An order may include manufacturer and logistic data elements, which comprise information and/or metadata associated with a sale including, for example, the date and time of the purchase, the manufacturer, manufacturing date, information regarding the purchased product and/or service (e.g., category, Stock Keeping Unit (SKU) number, product serial number), how payment was made, shipping information (e.g. street, city, state, zip code), shipping speed, information regarding the ecommerce provider, the logistics company, and so forth.

Purchases can charge to a digital wallet, which is an electronic device or application that allows individuals to make electronic transactions, such as an on-line purchase or using a smartphone to purchase something at a store. Example Digital Wallet providers include Apple Pay, Android Pay, and MasterPass. An individual's bank account and/or credit cards can be linked to the digital wallet. Additionally, user information, such as driver's license information, insurance card(s), loyalty card(s), and other identification documents, may be stored within the digital wallet. In some implementations, a user's credentials can be passed to a merchant's terminal wirelessly via near field communication (NFC). In the depicted example, digital wallet(s) may be employed to purchase goods and/or services from ecommerce merchant(s). When an order is received, ecommerce merchant may generate and send e-receipt to the respective digital wallet through which the order was placed. Additionally, when digital wallet(s) makes a purchase, the digital wallet may generate an e-receipt. The received and/or generated e-receipt is stored by the respective digital wallet and/or sent to the customer's email address, for example.

Communication may be done through email, web service, Short Message systems or messaging platforms. An SMS service provider is an entity that provides SMS messaging services and may act as an intermediary between mobile network operators and SMS service users. Many wireless services providers, such as AT&T, Sprint, Verizon, and T-Mobile, also serve as SMS service providers. Other example SMS service providers include groupme, kik, and Google Voice. In some example, communications may be done through application and platforms that enable cross-platform messaging as well as Voice over IP (VoIP). Example providers of messaging platforms includes WhatsApp™, Facebook Messenger™, Skype™, and Viber™

As can be appreciated by one skilled in the art, implementing the system can provide many advantages. For example, for third party logistics provider and warehouses and terminals, the system can improve/ensure on-time delivery of goods through, e.g., communication channel(s) and transparency on the carriers that are traveling to the warehouses/terminals, and the ability to schedule reliable slots/times for goods pickup and delivery. The platform 110 can provide higher throughputs with fewer assets needed.

As another example, for the carriers and truck drivers of carriers 120, the integration of heterogeneous fleet solutions (platforms) can ease the communication between dispatchers and drivers. By providing location-based information such as the latest traffic situation and/or relevant recommendations on parking and storage, idling times of the vehicles at the terminals and traffic jams can be reduced. As yet another example, for operators of transport network hubs 130 or public authorities, the platform 110 can provide a real-time transparency of network usage (e.g., road network, rail network, parking spaces, etc.) and the ability to predict impact of maintenance works. The platform 110 can also provide additional community services to the operators or public authorities to enable them to utilize the networks more efficiently and increase utilization.

Each of the stakeholders can gain value from the platform 110 according to their specific businesses. The logistics business involves many stakeholders including, for example, carriers, hub operators, third party logistics warehouses) and space and service providers. Each stakeholder has their own unique interests and needs in logistics data. For example, carriers are interested in telematics data of their vehicles; hub operators are interested in the operations of their hubs, and the space and service providers are interested in the operations of their businesses. Moreover, the stakeholders are also interest in each other's data. For example, carriers would like to know when a hub is experiencing hub congestions and delays, and the hub operators would like to know if carriers are experiencing traffic congestions and delays. The space and service providers would like to know where the vehicles are to better manage utilization. The system ensures that no sensitive information is shared.

A logistics company is an entity that provides the transportation and/or management over the flow of goods and materials between points of origin to the end-use destination. Logistics company may handle transportation, shipping, inventory, warehousing, packaging, and security functions for shipments. Example logistic entities include United Parcel Service (UPS), FedEx, United States Postal Service (USPS), DHL, and the internal logistics department of a company, such as (but not limited) to an internal logistics department of a manufacturer, ecommerce retailer, brick & mortar retailer, wholesaler and or distributor.

An automated warehouse is a facility where tasks related to shipping, storing, retrieving, and moving inventory are carried out by a variety of computer-controlled systems. In some implementations, automated warehouse may be controlled and/or owned by logistics company. In other implementations automated warehouse may be controlled and/or owned by a manufacturer or third party.

The platform 110 provides a demand-forecasting service that receives data from members of the platform 110 and a neural network engine to predict demand. The neural network engine is trained to recognize relevant data elements of the received orders in order to identify summary information regarding upcoming shipment volumes. The Learning machine can be trained to recognize the meaning of words and/or phrases in the received order data for both labeled and unlabeled fields. For example, the label "item description" in order data can be recognized by the AI module and used to interpret surrounding textual information to determine a product category for a described item(s).

The learning machine may also be trained to recognize abbreviated or differently named fields. For example, the term "s&h" may be interpreted the same as the term "shipping & handling"; the term "shipping speed" may be interpreted the same as the term "shipping option" or "delivery time"; and the terms "2", "2 of +item description", or "unit price×2" may all be interpreted as representing a quantity (e.g., two) of items in an order. Similarly, differing address formats, such as abbreviated street names, may also be recognized and interpreted by the Neural network.

The learning machine may also be trained to recognize brand names to determine a type(s) of product being delivered. For example, "Best Buy" may indicate that electronics are being delivered whereas "Levi's" may indicate that apparel is being delivered. Similarly, the Neural network may be trained to recognize a product description and/or SKU information to determine the exact or approximate dimensions and/or weight of the product(s) to be shipped.

In some implementations, the Learning machine may apply the Pareto principle (e.g., the 80/20 rule where roughly 80 percent of the effects come from 20 percent of the causes). For example, 20 percent of product descriptions for a specific product in the order data may be interpreted by the Learning machine to match 80 percent of the product description across orders of the same product's make and model, SKU, serial number, and so forth.

In some examples, the Learning machine may not be able to recognize a brand name when processing the order data. For example, should the brand name field have a value of "Walmart" (which is a retailer that sells multiple types of products) and the description of the product not be sufficiently captured otherwise in the order data, the Learning machine may have to look to other information within the order data to interpret the product description and/or SKU information or to determine the exact or approximate dimensions and weight of the product to be shipped. To process such discrepancies, the Learning machine can be trained through machine learning with orders from merchants that provide an amount of detail in the description that, for example, meets a threshold value based on configured criteria. Once trained, the Learning machine may rely on pattern recognition using the detailed descriptions from the training data to draw a correlation(s) with orders with incomplete or missing information, such as in the description or brand name fields. These correlations can increase the accuracy of the Learning machine in identifying, for example, the description, SKU, dimensions and/or weight of the product(s) that has been or will be shipped.

Moreover, the learning machine may be trained with product announcements and/or press releases to use as indicators to more accurately interpret the received order data. Product announcements can be made, for example, during a specific month of the year (e.g. Apple), at an annual user conference (which is typically at a specific week/month of the year), or at a product anniversary date. Product announcements and/or press releases may include information describing, for example, relevant makes and/or models of the product(s), SKUs for the product(s), a serial number(s) of the product(s), an expected date(s) when the products(s) will be available for sale, the specific merchant(s) and store location(s) selling the product(s), and so forth.

In a similar manner, the learning machine can be trained with additional indicators to improve the accuracy of interpreting product descriptions. These indicators may include information from social media, such as products' makes and models being discussed by consumers. For example, consumers may discuss when they have made a purchase and/or before making a purchase. Likewise, the number of Facebook or YouTube "Likes" as well as tweets and retweets regarding a product(s) can be employed to train the Learning machine to improve the accuracy of interpreting order data. For example, dates and timestamps associated with the social media comments regarding a product can be correlated with dates within orders data. Additional indicators can also include web searches regarding, for example, product makes and models and the dates and timestamps associated with searches; web cookies regarding the product makes and models being viewed on, for example, ecommerce websites; TV STB data regarding consumers viewing of a specific ad campaign(s); and credit and debit card data that includes, for example, product descriptions, SKUs, serial numbers.

The trained learning machine may use this data to complement insufficiently described or missing parameters from order data. For example, if an order is dated after or around the expected date when a product is available for sale, but is missing some or all of the product information, the date information can be used by the Neural network to determine the product associated with the order.

Once the learning machine has recognized and interpreted the information from the order data, the neural network aggregates various recognized and/or determined data elements to further identify and summarize the information regarding upcoming shipment volumes. Such aggregated information may be further analyzed by neural network, as described in detail below, to identify information related to shipment information, such as spikes, dips, and so forth, in the supply chain. This identified shipping information can be used to, for example, reallocate transportation assets, such as trucks, aerial drones, and autonomous vehicles.

As described above, relevant data elements of the received order data include the information and/or metadata associated with the sales captured within each respective order. This information may include, for example, shipping information (e.g. street, city, state, zip code), information regarding purchased products and/or services (e.g., category and SKU), shipping speed, information regarding ecommerce providers/merchants, and the logistics company used for fulfillment of the respective orders. Aggregated shipping information may include a total quantity of orders being shipped to a specific city, a specific zip code, a specific street, or to a general location for a set shipping speed (e.g. 2-Day Shipping). Further, different shipping speeds for a specific city, a specific zip code, a specific street, or to a general location can be analyzed and aggregated by the AI analyzer and aggregator 240. The shipping information may be employed to determine, for example, a number of resources to allocate in order to manage deliveries at the particular street or general location.

Aggregated information regarding purchased products and/or services may include, for example, a total quantity of orders being shipped within a specific product category or with a specific SKU or group of SKUs at the same shipping speed (e.g. 2-Day Shipping) or different shipping speeds. The aggregated information regarding products and/or services can be employed to, for example, calculate the physical dimensions of shipments in order to determine the number and types of resources to manage deliver of the particular products and/or services.

Aggregated information regarding shipping speed may include a total quantity of orders being shipped at the same shipping speed and/or different shipping speeds. The aggregated information regarding shipping speed can be employed to, for example, calculate the transportation mode (e.g. air, ground, rail, ocean, road, or combination thereof) to plan and manage delivery of the various respective shipments.

Aggregated information regarding ecommerce merchants may include, for example, calculating a total quantity of orders being shipped from a specific ecommerce merchant, such as ecommerce merchant from FIG. 1, and a total amount of shipping and handling fees for each specific ecommerce merchant. The total quantity and total amount can be employed to, for example, offer incentives to the respective ecommerce providers/merchant to use particular services and/or logistics companies for fulfillment. As an example, if 10,000 smart televisions are being delivered to a particular city at a cost of about $500,000 to customers, a logistics company can provide a special discount to the ecommerce merchant to use its services.

Aggregated information regarding the manufacturer and/or logistics company used for fulfillment of the respective orders may include, for example, calculating a total quantity of orders being produced and then shipped using a specific logistics company. The total quantity can be employed to determine a number of resources to allocate in order to accommodate production and delivery fulfillment for the respective orders.

Demand forecasting service is a service that aggregates purchase and logistic data to forecast demand, which may be used to identify and/or predict demand spikes or dips. Forecasts may be updated on a predetermined frequency in real-time, near real-time or periodically, such as hourly or daily. Forecasts can be utilized by manufacturers and logistics companies to, for example, allocate assets to production and to transport goods and provide services. In some implementations, demand-forecasting service is controlled and/or hosted by platform 110 provider.

In the depicted example, demand-forecasting service receives order data from a variety of sources, including ecommerce sites, distributors, retailers such as Macys or LL Beans. Demand forecasting service may receive order data directly from commerce enabled IoT devices or from IoT devices that are owned by retailers and logistics companies or third parties that have received the information from commerce enabled IoT devices, as described previously.

In some implementations, the demand-forecasting service bi-directionally communicates with the IoT device(s). The demand-forecasting service may set up the bi-directionally communication with IoT device(s) based on a subscription or having previously received order data. The bi-directional communication allows the demand-forecasting service to, for example, periodically (e.g. every few minutes, couple of hours, once each day depending on the configuration) retrieve order data for the IoT devices. For example, if an order data transmission from the IoT device is not received by the demand-forecasting service, the periodic communication from the demand-forecasting service provides another way for this information to be transmitted and received. Relevant data elements are aggregated by demand-forecasting service across multiple orders to generate summary information regarding upcoming shipment volumes. Example shipment volumes include the information and/or metadata associated with the sales captured within the respective orders including, for example, shipping information (e.g. street, city, state, zip code), information regarding purchased products and/or services (e.g., category, product serial number, and SKU), shipping speed, information regarding the ecommerce merchant, and the logistics company.

Internal data from members such as manufacturers and 3PL members can be added to demand-forecasting service. Internal data may include order history, external economic indicators, commodity prices, weather forecasts, inventory data, capacity data, and information from internal systems such as supply chain management systems, warehouse management systems, transportation management systems. The received internal data is employed by demand-forecasting service to train one or more prediction models. A machine learning algorithm(s) is applied to generate the logistic demand forecasting with the use of the trained one or more predictive models and the generated summary information that is aggregated from the received orders. Information from other data sources, such as credit and debit cards, search engines, Web cookies, TV STB data, social media, IoT Data, and so forth, may also be combined with the aggregated order data to generate the product demand forecast.

In the depicted example, manufacturer receives the consumption demand forecasting data from the neural network. In some implementations, manufacturer is able to receive the logistic demand forecasting data in real-time, near real-time, periodically to adjust demand forecasting, resource allocations (e.g., raw materials and production equipment), and/or pricing. The manufacturer can feed the production data direct to the logistics company and warehouse members including automated warehouse. Accordingly, the logistic demand forecasting data may be employed by manufacturers to provide greater intelligence of inventory and/or resources planning. In addition, logistics company receives the logistic demand forecasting data from the neural network. In some implementations, logistics company is able to receive the logistic demand forecasting data in real-time, near real-time, periodically to adjust demand forecasting, resource allocations (e.g., personnel and transportation assets), and/or pricing. Logistics company may feed the logistic demand forecasting data directly to automated warehouse. Accordingly, the logistic demand forecasting data may be employed by automated warehouse to provide greater intelligence of inventory and/or resources planning in any associated physical warehouses.

In the depicted example, the trained neural network can forecast demand and issues additional orders to the manufacturer and requests financing for the orders based on the orders. Banks will provide low cost financing secured by the orders. The system also can prepare the 3PL companies and warehouses for the load. For example, a forecast label may be used to represent the personnel headcount or a number of assets that will be needed by a logistics company to handle end-to-end upcoming shipments from pick-up address to delivery address. Variations for the forecast label, such as the specific types of labor (e.g., truck drivers, airplanes pilots, distribution center workers) or the specific types of transportation assets (e.g., trucks, airplanes, ships, railcars, aerial drones, autonomous vehicles), may also be used. Forecast data is generated based on the determined training data. The forecast data is imported into machine-learning algorithm, which then determines, for example, the personnel headcount or the amount of transportation assets needed to handle upcoming shipment volume. The forecast data may then be compared to an historical or "true" label to calculate an accuracy score. The accuracy score may be iteratively determined using thousands or millions of rows from the training data and/or forecast data. Rules can be set in the machine-learning algorithm to choose and recommend the forecast data based on, for example, an accuracy score falling within an acceptable margin percentage to the historical data. Additionally, other training and forecast data may be determined from, for example, social media, web searches, web cookies, TV STB data, credit and debit data, ACH data, and so forth. Machine learning can also be applied to adjust pricing per shipment using a similar approach. Implementations of the neural network may utilize machine-learning libraries, such as Scikit and TensorFlow.

As used herein, the term "real-time" refers to transmitting or processing data without intentional delay given the processing limitations of a system, the time required to accurately obtain data and images, and the rate of change of the data and images. In some examples, "real-time" is used to describe the presentation of information obtained from components of a demand forecasting system, such as depicted in FIG. 2.

In some variations, the platform 110 can be configured to allow new business partners and/or users access to the platform using a form based self-registration. In some variations, the platform can be configured to allow, for example, entrepreneurs run their own marketplace using the platform for product supply and delivery logistics, and new business partners can sign up using these marketplaces. In some variations, account activation/deactivation can be managed from the outside.

In some other variations, the commerce platform can be integrated with several external application services such as traffic information services, telematics data services from telematics data provide/broker or third party telematics data provider, and Transport Management Systems (or systems which expose transport orders, made available by terminal operators).

As another example, a third party logistics provider such as a warehouse or a terminal can utilize the platform 110 to improve/ensure on-time delivery of goods through the Commerce platform by providing them with data of relevant vehicles. This can allow the third party logistics provider to, for example, schedule reliable/accurate slots/times for goods pickup and delivery.

In some variations, the data that is provided to a particular user are processed to remove sensitive information (e.g., redacted, or converted to an anonymous format) so that the sensitive data is not shared. In some variations, this can be done, for example, based on a user profile data associated with the user that enables/disables certain access to certain data. In some variations, the access to data is dependent at least in part on data such as vehicle information (e.g., a vehicle's tour details/route plan).

The platform can also be configured to utilize other data to trigger a message. For example, the platform can receive real-time data (e.g., telematics data from one or more vehicles and/or other sensors or sources) regarding incidents along a route or at a destination (traffic and hub infrastructure), and when a trigger condition has been met, the platform generates an appropriate message to one or more appropriate vehicles.

In some variations, the platform can be configured to provide/share telemetric or other data among one or more registered business partners in a business network. For example, business partners who are interested in a vehicle that is not directly under its control can be provided with access to data related to that vehicle (e.g., permanently or temporarily). As another example, this can be provided when one or more transport orders/tours are served for another business partner.

In some variations, the platform 110 can provide contextual service offering. For example, the commerce platform can be configured to offer one or more services (e.g., promotions of parking and rest facilities) to a user (vehicle driver) of a vehicle based on location and/or traffic/infrastructure status. This can include, for example, current and/or past locations as well as current and/or past traffic/infrastructure status.

In some variations, the platform 110 can be configured to provide methods for service providers to subscribe to the platform and offer relevant services to other participating business partners. In some variations, the platform 110 can also be configured to enable new service providers to offer relevant services in a context and location-aware way. In some variations, the platform 110 can be configured to define and share services in a business partner network.

FIG. 3 depicts a flow diagram of an example process for handling an order for items from different manufacturers or vendors. A customer selects product(s) to purchase on an ecommerce merchant website (or native mobile app, mobile web) (302). The customer chooses a payment method (e.g., debit card, credit card, checking account) and enters delivery information (304), for example, a delivery/shipping address, a desired delivery time or time window, additional delivery/shipping addresses (in case the customer is unable to accept delivery at the first address), a delivery frequency (e.g., if the product(s) is to be shipped on a regular basis), an email address, a mobile phone number, and/or other relevant information for a logistics company. The customer reviews the order details and then clicks on the "Buy" button (306). The ecommerce website generates and sends an order that includes the order details (308). The order data is received and parsed by the demand-forecasting service (310). Demand forecast for the manufacturer and the logistics company is updated (312) by the demand-forecasting service based on relevant data from order. Next, the process checks if the items are from a single company or from multiple vendors (312). If the order is for items offered by different manufacturers, the system identifies the items from warehouse locations (314) and packages at least two items from different manufacturers (316), and ships the items from different vendors in one package to the customer (318).

As online purchases suffer a high return rate (in excess of 30% return rate) which can wipe out the profits of a sale, the platform 110 provides an AR system to make sure the product matches buyer's intended use of the product. This avoids unhappy customers and reduces return costs. FIG. 4 shows an exemplary process to use augmented reality (AR) to determine how well a particular product fits a buyer. The process is shown in FIG. 4 as follows:

Manufacturer transmits a 3D model of the product to Platform (402)

Potential Buyer uses a smart phone or AR to calibrate and measure dimensions of his/her environment (404)

3D model is scaled to the dimensions of the buyer environment (406) Scaled 3D model is superimposed on the viewport of the smartphone/AR device to allow user to see how well the product works as intended (408)

Buyer provides feedback and suggestions to Platform, including drawings and pictures, which are then sent to Manufacturer as a shared IP owned by Platform and Manufacturer for product improvement (410)

In one example, the system can recommend proper shoe size for a runner. This can be done by asking the buyer's current shoe vendor, and applying big data analysis correlating different manufacturer's sizes and create a correspondence between shoes from one manufacturer to other manufacturers.

Another embodiment includes the following:

capturing 3D model of user's feet;

identify the subject's current best fitting shoe products;

set each best fitting shoe product's inside dimension with dimensions from the 3D model plus a predetermined gap;

correlating different manufacturer's shoe sizes and creating correspondences among different manufacturer shoe products; and recommending a new shoe for the subject by looking up the correspondences among different manufacturer shoe products.

As part of or to assist with the size recommendation process, during analysis the computing device may also determine whether a user-selected item or shoe runs true to size. The system may make this determination before or after the user selects a product by comparing the stored parameter measurements for the user-selected item to standard information related to standard sizes. If one or more of the measured parameters differs by more than a threshold amount from the value(s) of its or their corresponding reference (standard) parameters, then the system may determine that the model of item does not run true to size. For example, for footwear, the system may compare internal measurements such as length and width for the user-selected item (e.g., a size 12 running shoe) to standard internal measurements for an industry standard (i.e., a reference model) running shoe. To determine the industry standard for a given parameter (i.e., maximum length or width of the overall shoe interior, or of a portion such as the toe box or heel), the computing device may compute an overall average for the parameter for all models that are stored in the data set in that particular size (e.g., overall averages of all internal measurements of all size 12 shoes). Alternatively, the industry standard size may be stored in the data set as provided by a manufacturer, a group of manufacturers, a supplier or group of suppliers, a retailer or a group or retailers, or other similar groups. The system also may consider tactile measurements such as stretch or deformation and use the size corresponding to maximum, minimum, or some intermediate level of stretch or deformation as the shoe's internal measurement in the comparison. During determination of whether an item runs true to size, the system may also consider data that reflects how an item fits as opposed to, or in addition to, determining whether the item is true to standard size. For example, a high heel shoe may include one or more straps that cross the top or arch of a wearer's foot and attach at various points on the sides of the shoe. When worn, one or more of the straps can cause the shoe to fit differently on the wearer's foot, thereby altering the fit and comfort of the shoe. Thus, the data set for that footwear model may include positive value (e.g., "yes," "true," or "1" for a parameter titled "horizontal straps"). The system may also consider such a feature, including various structural and decorative features integrated onto an item, that results in possible deviation from a user's selected size of that item when determining whether the user-selected item runs true to size. Additionally, the system can prompt the user for secondary sizing information and receive the secondary sizing information from the user via a user interface. Secondary sizing information may the size that the user is most likely to wear if their primary size does not fit properly, or an indication of whether the user is most likely to pick a larger or smaller size if their primary size does not fit properly. The computing device may use the secondary sizing information to provide a more accurate size recommendation for the user.

The system may include providing a sizing recommendation for wearable items such as footwear based upon personalized sizing information received from a user. The process accesses the wearable item data set can include various measurements and parameters related to each of the wearable items. The computing device may receive sizing information related to a specific user. For example, the sizing information may include a primary footwear size and a secondary footwear size as has been previously discussed. Based upon the received sizing information, the computing device may determine a personal reference size specific to that user. For example, the user may be prompted to input their primary footwear size, as well as their secondary footwear sizing information. The user may input that their primary footwear size is a 12, and that their secondary footwear sizing information is that they typically wear a size smaller than a 12 when not wearing their primary size. Based upon this information, the computing device may calculate the personal reference size to be an adjusted size that is smaller than size 12. The adjusted size may be a reference fraction between the user's primary size and secondary size, such as halfway between or ⅕ of a size between. For example, for the particular user discussed above, the personal reference size may be similar to a size 11.8, or slightly smaller than the user's primary size. Conversely, if the user indicated that they typically wear larger than a 12 for their secondary sizing information, the computing device may determine 406 that the user's personal reference size is similar to a size 12, or slightly larger than their primary size. The personal reference size need not be determined by measuring the user's actual foot (or other body part), but rather may be based on internal dimensions of hypothetical (modeled) or actual reference footwear items based on data previously provided by the user, or the user's previous purchases. The computing device can determine the personal reference size by establishing a set of internal wearable item measurements for a reference footwear model and establishing the reference size to be an extrapolated (or interpolated) size that corresponds to the reference model. To continue the above example, the computing device may determine that a user has a personal reference size of about 11.8. The computing device may establish a graph or other similar representation of all footwear that have sizing information stored in the data set, plotting each size against each internal measurement for each individual piece of footwear. The computing device may then fit a best fit line into the data, providing a reference for each measurement as it compares to each footwear size. The computing device can then locate the user's personal reference size, e.g., 11.8, on the graph for each measurement to determine a set of personalized internal measurements for that user. Based upon the user's personal reference, the computing device may identify a recommended size for a user-selected item, and it may provide the recommended size to the user based on how close the user's reference size runs to an actual size, with an adjustment of the model does not run true to size. To continue the above example, if the computing device determines that a user's personal reference are similar to a size 11.8 and the shoe runs true to size, the computing device may identify a size 12 for the shoe since that shoe size the available size that is closest to the user's reference size. Alternatively, for a shoe that runs larger than true to size, the computing device may identify 408 the first available size that is smaller than the user's reference size. In this case, the identified size would be 11.5. Optionally, the system may also consider stretch or deformation, and add or subtract an expected stretch or deformation amount from the user-selected item measurements when selecting the size of that time that is appropriate for the user.

Another exemplary process for fitting clothing includes placing the buyer's body adjacent an object with known dimensions. The body can be the upper body of a person or the entire body of the person. The process then takes multiple images or videos of the body and a reference object, as done above. Next, photogrammetric techniques are performed to create a 3D model of the body with dimensions based on the reference object. The process optionally selects a standard body template and Morph/Warps the standard body template to match 3D body model. Next, the process selects the best fitting wearable item or apparel. The present systems include determining and providing sizing information to a user for a specific apparel item in response to a user selection of the apparel item from a retailer, for example, an online retailer. As used herein, "wearable item" or "apparel" refers to any item or collection of items that are designed, sized and/or configured to be worn by a person. Examples of wearable items or apparel include footwear, outerwear (including, but not limited to coats, jackets, ponchos, capes, robes, cloaks, gloves, and other related outerwear), clothing (including, but not limited to, socks, pants, shorts, skirts, dresses, shirts, gowns, sweaters, hosiery, suits, underwear, lingerie, saris, wraps, swimsuits, neckwear, belts, and other related clothing), headgear (including, but not limited to, hats, helmets, glasses, sunglasses, goggles, earmuffs, scarves, and other related headgear), sporting accessories (including, but not limited to, pads, shin-guards, mouthpieces, protective sleeves, sports-specific gloves, and other related sporting accessories) and other related wearable items. "Apparel model" or "wearable item model" refers to a specific type or version of apparel offered by a manufacturer, typically having a name, model and item number or code. For example, a footwear model refers to a specific model of footwear offered by a manufacturer. "Apparel representation" refers to a computer-readable representation of an apparel model stored in a computer readable medium. An apparel representation may be a two dimensional or a three dimensional representation. For example, a footwear representation may be a 3D representation of a specific footwear model.

Using the deformable body models, the system can handle informal images of the body, for example, when standard digital camera images (e.g. cell phone cameras) are used as input and when only one, or a small number, of images of the person are available. Additionally these images may be acquired outside a controlled environment, making the camera calibration parameters (internal properties and position and orientation in the world) unknown. To recover body shape from standard sensors in less constrained environments and under clothing, the deformable model such as a parametric 3D model of the human body is employed. The term "body shape" means a pose independent representation that characterizes the fixed skeletal structure (e.g. length of the bones) and the distribution of soft tissue (muscle and fat). The phrase "parametric model" refers any 3D body model where the shape and pose of the body are determined by a few parameters. A graphics model is used that is represented as a triangulated mesh (other types of explicit meshes are possible such as quadrilateral meshes as are implicit surface models such as NURBS). The deformable body model allows a wide range of body shapes and sizes can be expressed by a small number of parameters. The deformable model captures the statistical variability across a human population with a smaller number of parameters (e.g. fewer than 100). To represent a wide variety of human shapes with a low-dimensional model, statistical learning is used to model the variability of body shape across a population (or sub-population). With a low-dimensional model, only a few parameters need to be estimated to represent body shape. This simplifies the estimation problem and means that accurate measurements can be obtained even with noisy, limited or ambiguous sensor measurements. Also, because a parametric model is being fitted, the model can cope with missing data. While traditional scanners often produce 3D meshes with holes, the deformable models can reconstruct a body shape without holes and without a need to densely measure locations on the body to fit the 3D model. Only a relatively small number of fairly weak measurements are needed to fit the model. The deformable body model also factors changes in body shape due to identity and changes due to pose. This means that changes in the articulated pose of the model do not significantly affect the intrinsic shape of the body. This factoring allows the combining of information about a person's body shape from images or sensor measurements of them in several articulated poses. This concept is used to robustly estimate a consistent body shape from a small number of images or under clothing.

In one embodiment, a method and system are described that enable the recovery of body shape even when a person is wearing clothing. To estimate body shape under clothing, image classifiers are employed to detect regions corresponding to skin, hair or clothing. In skin regions, it is recognized that the actual body is being observed but in other regions it is recognized that the body is obscured. In the obscured regions, the fitting procedure is modified to take into account that clothing or hair makes the body appear larger. The process allows for fitting the body shape to partial depth information (e.g. from a time-of-flight sensor) that is robust to clothing. Unlike a laser range scan, most range sensors provide information about depth on only one side of the object. Information can be gained about other views if the person moves and multiple range images are captured. In this case one must deal with changes in articulated pose between captures. The method estimates a single body model consistent with all views. The disclosed method further uses image intensity or color information to locate putative clothed regions in the range scan and augments the matching function in these regions to be robust to clothing.

In many applications it is useful to employ just one or a small number of images or other sensor measurements in estimating body shape. Furthermore with hand-held digital camera images, information about the camera's location in the world is typically unknown (i.e. the camera is uncalibrated). In such situations, many body shapes may explain the same data. To deal with this, a method is described for constrained optimization of body shape where the recovered model is constrained to have certain known properties such as a specific height, weight, etc. A new method is defined for directly estimating camera calibration along with body shape and pose parameters. When the environment can be controlled however, other approaches to solving for camera calibration are possible. Additionally, a method and apparatus are described that uses "multi-chromatic keying" to enable both camera calibration and segmentation of an object (person) from the background.

Each body model recovered from measurements is mapped in full correspondence with every other body model. This means that a vertex on the right shoulder in one person corresponds to the same vertex on another person's shoulder. This is unlike traditional laser or structured light scans where the mesh topology for every person is different. This formulation allows body shapes to be matched to each other to determine how similar they are; the method makes use of this in several ways. Additionally, it allows several methods to extract standard tailoring measurements, clothing sizes, gender and other information from body scans. Unlike traditional methods for measuring body meshes, the presently disclosed methods use a database of body shapes with known attributes (such as height, waist size, preferred clothing sizes, etc) to learn a mapping from body shape to attributes. The presently disclosed method describes both parametric and non-parametric methods for estimating attributes from body shape.

Finally, a means for body shape matching takes a body produced from some measurements (tailoring measures, images, range sensor data) and returns one or more "scores" indicating how similar it is in shape to another body or database of bodies. This matching means is used to rank body shape similarity to, for example, reorder a display of attributes associated with a database of bodies. Such attributes might be items for sale, information about preferred clothing sizes, images, textual information or advertisements. The display of these attributes presented to a user may be ordered so that the presented items are those corresponding to people with bodies most similar to theirs. The matching and ranking means can be used to make selective recommendations based on similar body shapes. The attributes (e.g. clothing size preference) of people with similar body shapes can be aggregated to recommend attributes to a user in a form of body-shape-sensitive collaborative filtering.

To create a codebook of deformable body models, a database of body scan information is obtained or generated. One suitable database of body scan information is known as the "Civilian American and European Surface Anthropometry Resource" (CAESAR) and is commercially available from SAE International, Warrendale, Pa. The bodies are aligned and then statistical learning methods are applied within the statistical learning system to learn a low-dimensional parametric body model that captures the variability in shape across people and poses. One embodiment employs the SCAPE representation for the parametric model taught by Anguelov et al. (2005).

The system then automatically estimate the gender of a person based on their body scan. Two approaches for the estimation of the gender of a person are described. The first uses a gender-neutral model of body shape that includes men and women. Using a large database of body shapes, the shape coefficients for men and women, when embedded in a low dimensional gender-neutral subspace, become separated in very distinctive clusters. This allows the training of gender classifiers to predict gender for newly scanned individuals based on shape parameters. A second approach fits two gender-specific models to the sensor measurements: one for men and one for women. The model producing the lowest value of the cost function is selected as the most likely gender. In one embodiment, the process produces standard biometric or tailoring measurements (e.g. inseam, waist size, etc.), pre-defined sizes (e.g. shirt size, dress size, etc.) or shape categories (e.g. "athletic", "pear shaped", "sloped shoulders", etc.). The estimation of these attributes exploits a database that contains body shapes and associated attributes and is performed using either a parametric or a non-parametric estimation technique. The gender and/or the biometric or tailoring measurements are used to select a best fitting deformable body model.

Once the best fitting deformable body model is selected using the body codebook models, the system can match various points on the body to the deformable model. The fitting can be performed with people wearing minimal clothing (e.g. underwear or tights) or wearing standard street clothing. In either case, multiple body poses may be combined to improve the shape estimate. This exploits the fact that human body shape (e.g. limb lengths, weight, etc.) is constant even though the pose of the body may change. In the case of a clothed subject, a clothing-insensitive (that is, robust to the presence of clothing) cost function is used as regions corresponding to the body in the frames (images or depth data) are generally larger for people in clothes and makes the shape fitting sensitive to this fact. Combining measurements from multiple poses is particularly useful for clothed people because, in each pose, the clothing fits the body differently, providing different constraints on the underlying shape. Additionally, the optional skin detection component within the calibration and data pre-processing system is used to modify the cost function in non-skin regions. In these regions the body shape does not have to match the image measurements exactly. The clothing-insensitive fitting method provides a way of inferring what people look like under clothing. The method applies to standard camera images and/or range data. The advantage of this is that people need not remove all their clothes to obtain a reasonable body model. Of course, the removal of bulky outer garments such as sweaters will lead to increased accuracy. The output of this process is a fitted body model that is represented by a small number of shape and pose parameters. The fitted model is provided as input to the display and clothing recommender or an apparel fabrication system.

In addition to body shape, the match score may take into account information about products such as clothing. A distance is defined between products. This may be implemented as a lookup table. Let pi be a vector of clothing descriptors such as [Brand, Gender, Clothing_Type, Style, Size]; for example [Gap, Women, Jeans, Relaxed, 8]. The product distance function returns the distance between any two such descriptor vectors. An exact match of brand, clothing type, style and size could be assigned a distance of zero. A match that only includes brand, clothing type and size can be assigned a higher value. Differences in size produce proportionally higher distances.

In a typical scenario, a user wishes to know if a particular garment with properties will fit them. A potentially similar body may have many product vectors associated with it. A product distance between user and test bodies is determined where the closest matching (minimum distance) product vector is found and this distance is returned as the overall match. A general product distance between two bodies can be computed as to find the two most similar product vectors for the two bodies and return their distance.

Additionally, stored in the database with information about products is optional user-supplied ratings. The ratings can be used to augment the product match score; for example by adding a constant to it. A high rating could add zero while a low rating could add a large constant. In this way, both similarity of the item and its rating are combined.

When a body model is created, it may be stored in a secure database with a unique identifier associated with a user. Specifically, the shape coefficients are stored along with the version of the shape basis used (including the date of creation and whether it was created for a sub-population). This allows the body to be reconstructed, matched or measured independent of when it was scanned. If a pair of bodies are created with two different shape bases, it is straightforward (given vertex correspondence) to convert one or both of them into a common basis for comparison or measurement (Section 10). Additionally, ancillary data that the user enters may be stored such as their age, ethnicity, clothing sizes, clothing preferences, etc.

A user may access their body model in one of several standard ways such as by logging onto a website over a computer network using a unique identifier and password. The body model information may also be stored on a physical device such as a phone, key fob, smart card, etc. This portable version allows the user to provide their information to a retailer for example using an appropriate transmission device (e.g. card reader).

The body identifier may be provided by the user to retailers, on-line stores, or made available to friends and relatives with or without privacy protection. In providing access to their body model, the user may provide limited rights using standard digital property rights management methods. For example, they may provide access to a friend or family member who can then provide their information to a clothing retailer, but that person could be prohibited from viewing the body model graphically. As another example, a user could provide access to display the body to video game software to enable the use of the model as a video game avatar, but restrict the further transmission of the model or its derived measurements.

When a person purchases clothing from a retailer (e.g. over the Internet) using their body model, the size and brand information may be (optionally) stored with their body model. This information may be entered manually by the user with a graphical interface or automatically by software that collects the retail purchase information. Optionally the user can provide one or more ratings of the item related to its fit or other properties and these may be stored in the database in association with the clothing entry.

If a person has multiple body scans obtained on different dates, they may all be maintained in the database. The most recent model can be used by default for matching and measurement. When ancillary data is stored, it is associated with the most current scan at that time. Additionally, storing multiple body models enables several applications. For example, body measurements can be extracted and plotted as a function of time. The shape of the body can also be animated as a movie or displayed so as to show the changes in body shape over time. One method provides a graphical color coding of the body model to illustrate changes in body shape (e.g. due to weight loss). Since all model vertices are in correspondence, it is easy to measure the Euclidean distance between vertices of different models. This distance can be assigned a color from a range of colors that signify the type of change (e.g. increase or decrease in size as measured by vertex displacement along its surface normal). Color can alternatively be mapped to other shape attributes (such as curvature) computed from the mesh. The colors are then used to texture map the body model for display on a graphical device.

Collaborative filtering or recommendation uses information about many people to predict information about an individual who may share attributes in common with others. A common example is movie ratings. If many people who liked movie X also liked movie Y, an individual who liked X but has not seen Y may reasonably be expected to like Y.

A new form of collaborative filtering based on 3D body shape is presently disclosed. People with similarly shaped bodies may be expected to be interested in similar products such as clothing or weight loss products. Specifically if many people with similar body shapes to X buy pants of size Y, then an individual X may also be expected to fit size Y. Thus, a body shape model is used as described to match people based on body shape (Section 9 and 10d).

Several embodiments of this method of body shape matching are possible: 1. Size recommendation. If a user is shopping for clothing of a particular type, the system identifies N people with similar body shapes (Section 9 and 10d) for whom ancillary data related to this (or similar) item is stored in the database (e.g. use the product distance function). A function is used (e.g. a weighed combination based on body shape distance) to predict the best size (Section 10d). Body shape as well as similarity in clothing preference may be used in the matching (Section 9).

2. Community ratings. Instead of being presented with a specific size, the user is presented with a list of ratings for the product by people of similar size. The degree of similarity is shown along with optional entries such as the rating, comments, photos, etc. The degree of similarity can be expressed on a point scale or percentage scale by taking the body shape distance measure (Section 9) and normalizing it to a new range (e.g. 1-100 where 100 is an exact match and 1 is the match to a very different body shape).

3. Community blogs. People with similar body shapes may be trying to lose weight or increase their fitness. Shape-based matching is used to find people with similar body shapes. Groups of people with similar shapes (an possibly preferences) define a "community". Users can post information (e.g. in a blog format) about themselves and find postings by other members of the community who of similar shape (or who have undergone as similar change in shape). The key concept is that community is defined based on body shape-related properties.

A seller of a particular garment can associate a body shape, or fit model with a garment where that body is known to fit that garment. For example an individual wants to sell an item of clothing that fits them through an on-line auction. They list the item along with a unique identifier that can be used to match any other body model to theirs. A buyer looking for clothing provides their unique body identifier and the matching component compares the 3D body shapes and ancillary data (including optional ratings of clothing fit) retrieved from a database to determine the match score. Given a plurality of other matches from other fit models a display and ranking software component sorts the items for sale based on the match score (how similar their body is to the seller's). This method for sizing clothing applies to any retail application where a fit model for each clothing size is scanned and the associated body identifier is used to determine whether a new individual will fit that size. A score of the quality of fit (based on the body match score) can be presented or a threshold on the match score can be used to identify one (or a small number of) size(s) (i.e. fit models) that will fit the user's body. This method is analogous to having a friend or personal shopper who is the buyer's size and shape and who tries on clothing for them to see if it fits before recommending it.

More generally, there may be a large database of people who have tried on the same (or similar) garment and each of them can be viewed as a fit model; every person in the database can be a fit model for any product associated with them. The match distance (Section 9) between bodies incorporates shape and other attributes. Attributes can include one or more ratings of the product (for fit, style, value, etc.). The total match score can then include a term for the fit rating indicating whether the garment fits the fit model. Alternatively, the match can be performed on body shape and an aggregate fit rating for the matched bodies computed (Section 10d). If the matched bodies have associated reviews for the product stored in the database, these reviews may be optionally displayed to the user such that they are optionally ranked by match score.

In an alternative embodiment, the match similarity is computed only based on product information (brand, style, size) using the ancillary or product distance function (Section 9). A user selects a particular garment and a list of matches (IDs) is generated from the database where each ID corresponds to a person who has purchased and/or rated the product. The body shapes of the matching IDs are compared to the user's body shape by computing the body shape match score. An aggregate of all these scores is computed; for example by computing the mean score. This score is presented to the user (e.g. on a 100-point scale) to indicate how well the garment may fit them.

Automatically Obtaining Fit for Clothing Presented on a Web Page can be done. Using the techniques above for matching a user's body to a database of other bodies that have tried on similar garments, the system includes determining relevant clothing brand, style and size information from a website. When the user clicks a button to obtain their size for a given garment, the size determining process obtains their unique body identifier. The unique identifier for the user's body model may be stored on their computer hard disk or memory, for example, in the form of a "cookie". Alternatively, if no cookie is present, the user is asked to provide authenticating information such as a username and password. Once identified, the body shape of the user is known. The size determining process searches a database for people with similar bodies who have purchased or rated the clothing item as determined by the product determining process. The match score is computed and the N best matches are identified. The number of matches can vary but the default setting in one embodiment is 10. Ratings and comments stored with the N matches may be displayed. Alternatively the size preferences of these N bodies may be combined to recommend a particular size for the determined product.

Measurements extracted from the body can be used as input to standard pattern generation software for custom clothing or to on-line forms for ordering custom (or semi-custom) clothing.

A shape-sensitive advertising component uses the body model in conjunction with on-line (or cell phone) web browsing and shopping. Based on a person's body shape, advertising (e.g. banner ads in a web browser) may vary. For example, advertisers can select a range of body shapes that fit their product demographics (e.g. heavy men or short women). The body-shape matching component matches advertiser specifications with body shapes and presents shape-targeted advertisements (e.g. for weight loss or plus-sized clothing). For example, an advertiser may specify a gender, height and weight range, a bust size, etc. Advertisers may also specify body shapes based on example 3D body models selected from an electronic presentation of different body shapes or by providing a fit model scan. These exemplar bodies are then used to produce a match score that determines how similar a user is to the exemplar specification.

Body shape information about a user may be stored on the user's computer; for example in the form of a "cookie" that provides a unique identifier to an ad manager software component. The ad manager software component retrieves information about the body from a body model database using the unique identifier. The ad manager software component can keep the identity of the user private and communicate general information about their body shape to a shape-sensitive ad exchange software component. This information may include body shape coefficients, the ID of a similar exemplar body, measurements such as height or weight, demographic information such as age and gender, and shape category information such as athletic or heavy build. It should be understood that standard ad targeting information can also be supplied such as IP address, geographic location and historical click/purchase information. The shape-sensitive ad exchange component matches the shape information about a user to a database of advertiser requests. If there are multiple matching advertisements, one or more of the matching advertisements is selected for display. The mechanism for selection can be randomized or can take into account how much an advertiser is willing to pay. The rate for each advertisement may vary depending on the overall quality of the match score (i.e. how close the user's measurements are to the target shape specified by the advertiser). A standard bartering or auction mechanism may be used for advertisers to compete for presentation to matched users. Statistics of purchases and advertising-related click histories for people of particular body shapes are collected and stored in a database. Matches to the body shapes of other shoppers or website users can also be used to target advertising based on the purchases of other people of similar shape. This is achieved by finding similar body shapes using the body shape matching component and accessing the stored shopping and clicking statistics for people of similar shape. If a person of a particular shape has clicked on an advertisement, an advertiser may pay more for presentation to a similarly shaped person. Any website can be enabled with this shape-sensitive advertising feature using cookies. Users can disable this feature by changing their browser preferences. This shape feature can be combined with other commonly acquired information about shopping and clicking behavior used for the presentation of personalized or targeted advertising.

The estimated body shape model can also be used to try on virtual clothing. There are several computer graphics methods, including commercial products, for simulating clothing draped on 3D bodies and these are not discussed here. The body model can be saved in any one of the common graphics model formats and imported into a standard clothing simulation software system.

Virtual try on is enabled by collecting a database of models of different shapes and sizes wearing a plurality of clothing items. When the user wants to see how they will look in a particular clothing item, the database of stored models is searched for the closest matching body shape for which an image (or graphic representation) of the model in that item exists. This image is then displayed to the user. In this way, each person visiting a retail clothing website may see the same merchandise but on different models (models that look most like them). This provides the equivalent of a personalized clothing catalog for the person's shape. This is a form of "example-based virtual clothing" Rather than rendering clothing using graphics, many images of models are stored and recalled as needed. The key concept is that this recall is based on similarity of body shape.

The process of FIG. 4 can be used for furniture or appliance fit analysis. In this case, the furniture manufacturer transmits a 3D model of the product to Platform and the Potential Buyer uses a smart phone or AR to calibrate and measure dimensions of his/her environment, and the 3D model is scaled to the dimensions of the buyer environment to see if the product fits. The scaled 3D model is superimposed on the viewport of the smartphone/AR device to allow user to see how well the product works as intended. The user can do virtual walk around of the space to ensure the furniture blends in well with the home before ordering, as the return of furniture can be quite expensive.

FIG. 5 depicts a flow diagram of an example process for providing manufacturing and logistic demand forecasting, according to implementations. The process receives a plurality of orders, each including a plurality of manufacturing/logistic data elements, in real-time, near real-time, or periodically (502). The orders are analyzed to aggregate the manufacturing and logistics data elements (504). The process applies a neural network trained as a demand forecasting analytics model to the aggregated manufacturing/logistic data elements (506). In some implementations, the demand forecasting analytics model is trained using a set of training data that describes an historic or actual demand within a manufacturing/supply chain. The process determines a demand forecast, indicating an upcoming demand for production and transportation assets within the product supply chain (508). The process provides the manufacturing demand forecasting to the manufacturer and the logistic demand forecasting to the logistics organization (510). The logistics organization may in turn inform an automated warehouse system, such as automated warehouse, servicing the logistic supply chain.

FIGS. 6A-6B show exemplary learning machine details. FIG. 6A shows different types of learning machines that can be used, including supervised and unsupervised learning machines and reinforcement learning machines, along with sub categories. FIG. 6B shows exemplary neural network architectures. A supervised learning algorithm analyzes the training data and produces an inferred function, which can be used for mapping new examples. An unsupervised machine-learning algorithm draws inferences from datasets consisting of input data without labeled responses. A reinforcement-learning algorithm allows for the automatic determination an ideal behavior within a specific context, in order to maximize performance. A supervised learning technique is described in the depicted and following examples; however, any of these three or other techniques may be used to interpret the order data and to determine the logistic demand forecasting data. Once determined, the demand forecasting data may be stored on the cloud, and/or elsewhere, and may be transmitted to, for example, one or more production centers, logistics organizations, and automated warehouses for various uses as described in FIG. 2. In one example, a training data generator generates training data based on historical and actual demand, which is determined from the internal data that may be received from one or more manufacturers, logistics companies, warehouses, and retailers/ecommerce companies.

The classifier may be trained based on real-time (e.g., actual) or periodic (e.g., historical), such as hourly or daily, training data. A classifier is an algorithm that implements classification or a mapping of input data to a category. The classifier may be a particular type of classifier, such as a decision tree, artificial neural network, or SVM. A decision tree classifier organizes a series of test questions and conditions in a tree structure. An algorithm may then navigate through the tree structure (e.g., through the series of questions) until a leaf node is reached. A neural network classifier includes a series of units (neurons), arranged in layers, which convert an input vector into some output. Each unit takes an input, applies a function, such as a non-linear function, to it and then passes the output to the next layer. The networks may be defined to be, for example, feed-forward, such that a unit feeds its output to all the units on the next layer, but no feedback is provided to the previous layer. Weights may be applied to the signals passing from one unit to another. The weights are tuned in the training phase to adapt a neural network to a particular problem at hand (e.g., interpreting e-receipt data or logistics demand forecasting). An SVM is a discriminative classifier with associated learning algorithms that analyze data used for classification and regression analysis. For a given set of training examples, each marked as belonging to one or the other of two categories, an SVM training algorithm builds a model that assigns new examples to one category or the other, making it a non-probabilistic binary linear classifier. Models within an SVM are representations of the training examples as points in space, mapped so that the examples of the separate categories are divided by a clear gap that is as wide as possible. As the model is trained, new examples are mapped and predicted to belong to a category based on which side of the gap they fall.

One embodiment uses a conditional-GAN (cGAN) as a deep learning machine. The cGAN consists of two major parts: generator G and discriminator D. The task of generator is to produce an image indistinguishable from a real image and "fool" the discriminator. The task of the discriminator is to distinguish between real image and fake image from the generator, given the reference input image.

The objective of a conditional-GAN is composed of of two parts: adversarial loss and LI loss. The adversarial loss can be: $\mathcal{L}_{cGAN}(G,D)=E_{x,y}[\log D(x,y)]+E_x[\log(1-D(x,G(x))]$ where L1 distance is added to generated image. L1 distance is preferred over L2 distance as it produces images with less blurring. Thus our full objective for the minimax game is:

$$(G^*, D^*) = \arg\min_G\max_D(\mathcal{L}_{cGAN}(G, D) + \lambda\mathcal{L}_{L1}(G))$$

The ResNet-50 network by He et al. can be used as the generator, while the discriminator can be a convolutional "PatchGAN" classifier with architecture similar to the classifier in pix2pix as our discriminator.

In addition to cGAN, other neural networks can be used. Exemplary alternatives include:

1. AlexNet—AlexNet is the first deep architecture which can be introduced by one of the pioneers in deep learning—Geoffrey Hinton and his colleagues. It is a simple yet powerful network architecture, which helped pave the way for groundbreaking research in Deep Learning as it is now.

2. VGG Net—The VGG Network can be introduced by the researchers at Visual Graphics Group at Oxford (hence the name VGG). This network is specially characterized by its pyramidal shape, where the bottom layers which are closer to the image are wide, whereas the top layers are deep. VGG contains subsequent convolutional layers followed by pooling layers. The pooling layers are responsible for making the layers narrower. In their paper, they proposed multiple such types of networks, with change in deepness of the architecture.

3. GoogleNet—In this architecture, along with going deeper (it contains 22 layers in comparison to VGG which had 19 layers), the Inception module is used. In a single layer, multiple types of "feature extractors" are present. This indirectly helps the network perform better, as the network at training itself has many options to choose from when solving the task. It can either choose to convolve the input, or to pool it directly. The final architecture contains multiple of these inception modules stacked one over the other. Even the training is slightly different in GoogleNet, as most of the topmost layers have their own output layer. This nuance helps the model converge faster, as there is a joint training as well as parallel training for the layers itself.

4. ResNet—ResNet is one of the monster architectures which truly define how deep a deep learning architecture can be. Residual Networks (ResNet in short) consists of multiple subsequent residual modules, which are the basic building block of ResNet architecture. ResNet uses of standard SGD instead of a fancy adaptive learning technique. This is done along with a reasonable initialization function which keeps the training intact; Changes in preprocessing the input, where the input is first divided into patches and then fed into the network. The main advantage of ResNet is that hundreds, even thousands of these residual layers can be used to create a network and then trained. This is a bit different from usual sequential networks, where you see that there is reduced performance upgrades as you increase the number of layers.

5. ResNeXt—ResNeXt is said to be the current state-of-the-art technique for object recognition. It builds upon the concepts of inception and resnet to bring about a new and improved architecture.

6. RCNN (Region Based CNN)—Region Based CNN architecture is said to be the most influential of all the deep learning architectures that have been applied to object detection problem. To solve detection problem, what RCNN does is to attempt to draw a bounding box over all the objects present in the image, and then recognize what object is in the image.

7. YOLO (You Only Look Once)—YOLO is a real time system built on deep learning for solving image detection problems. As seen in the below given image, it first divides the image into defined bounding boxes, and then runs a recognition algorithm in parallel for all of these boxes to identify which object class do they belong to. After identifying this classes, it goes on to merging these boxes intelligently to form an optimal bounding box around the objects. All of this is done in parallely, so it can run in real time; processing upto 40 images in a second.

8. SqueezeNet—The squeezeNet architecture is one more powerful architecture which is extremely useful in low bandwidth scenarios like mobile platforms. This architecture has occupies only 4.9 MB of space, on the other hand, inception occupies ~100 MB! This drastic change is brought up by a specialized structure called the fire module which is good for mobile phone.

9. SegNet—SegNet is a deep learning architecture applied to solve image segmentation problem. It consists of sequence of processing layers (encoders) followed by a corresponding set of decoders for a pixelwise classification.

Below image summarizes the working of SegNet. One key feature of SegNet is that it retains high frequency details in segmented image as the pooling indices of encoder network is connected to pooling indices of decoder networks. In short, the information transfer is direct instead of convolving them. SegNet is one the the best model to use when dealing with image segmentation problems.

Figure 7:
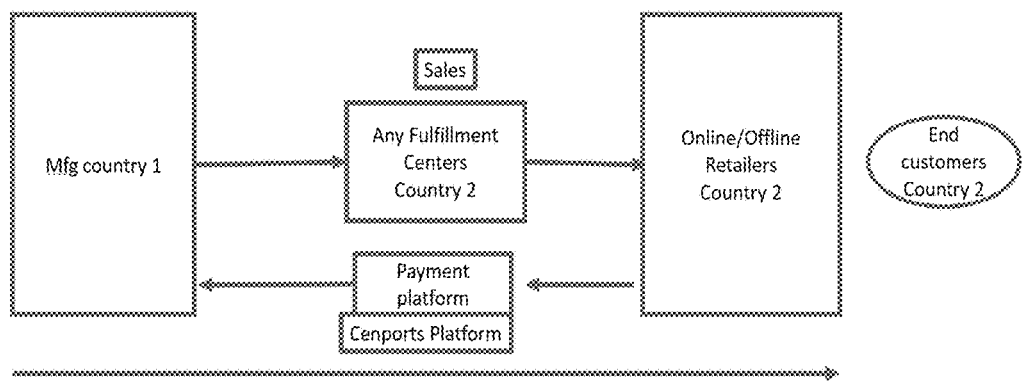
FIGS. 7-9 show another exemplary embodiment for drop-shipping orders.
Figure 8:
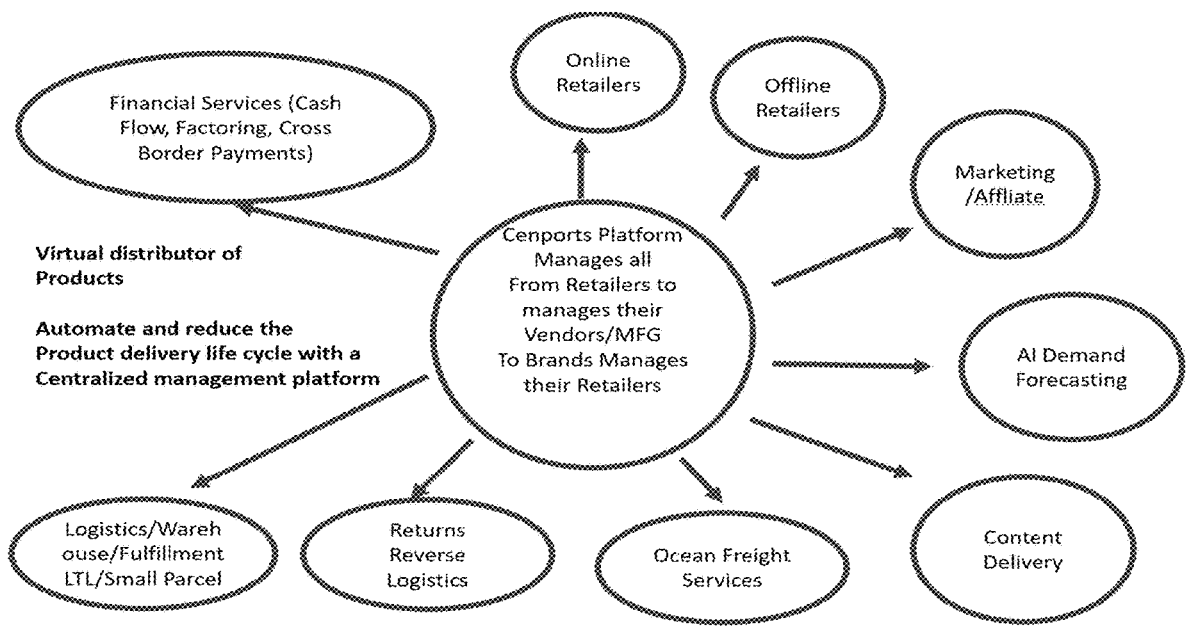
Figure 9:
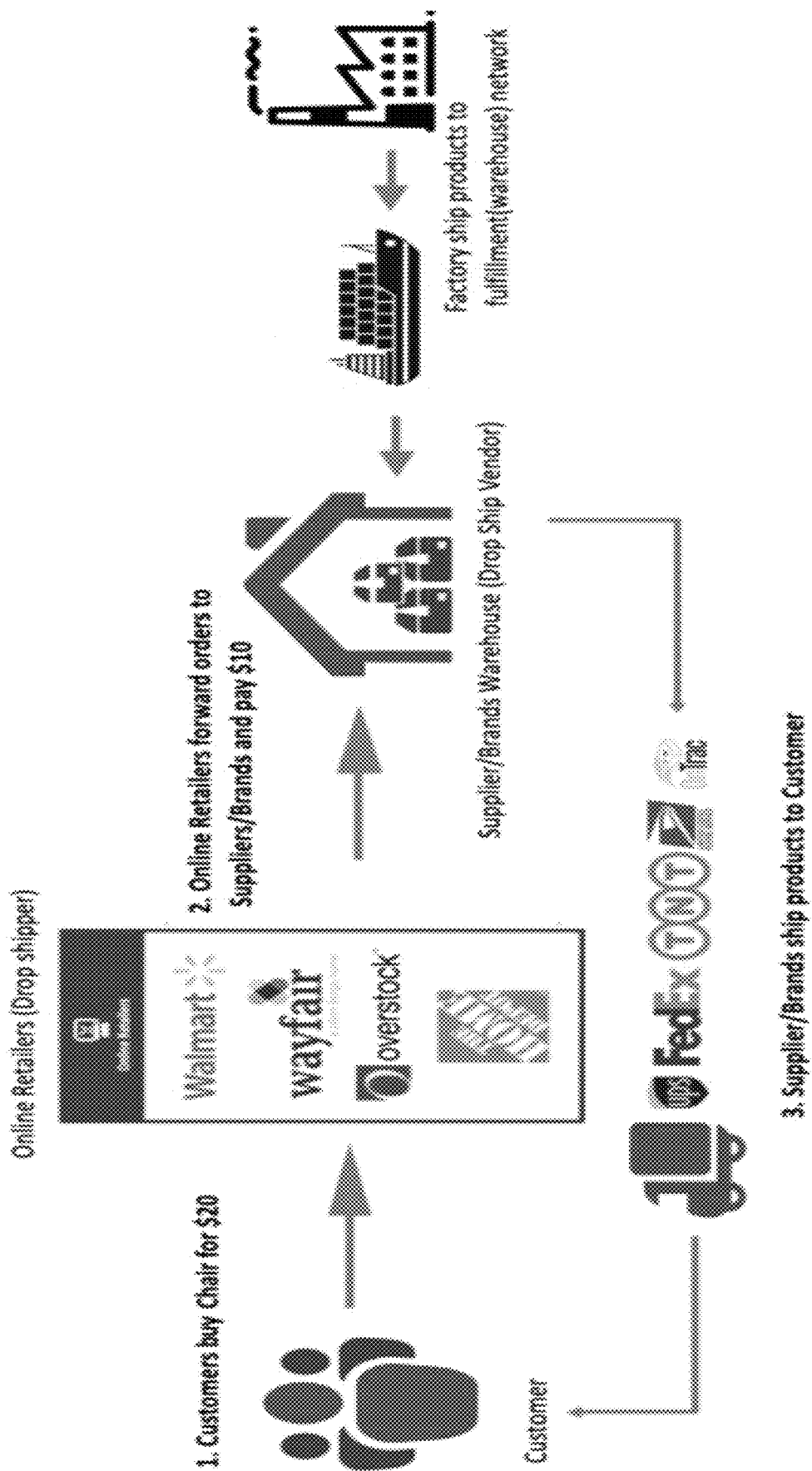

FIGS. 7-9 show another exemplary embodiment for drop shipping orders. In FIG. 7, consumers are located in a second country while products or widgets are produced in a first country. The consumer communicates through a retailer in the second country and makes payment through the drop shipping system, which in turn sends the order and a discounted payment to the manufacturer. The manufacturer completes the order and ships the widget to a fulfillment network in the second country for drop-shipping to the consumer. The retailers or branded companies simply promote the product but are saved from the manufacturing risks, while the manufacturers can focus on their production expertise without dealing with the marketing and sales issues.

The system/platform manages the whole flow from Ocean Freight, Logistics, Fulfillment, Sales, Payments, cross border payment. The marketing of the widget is done within one platform. Machine learning determines where to store products and optimize the delivery of products in different jurisdictions. The manufacturer from country 1 would not need business license or presence in country 2 to manage the sales and logistics of their products. The system of FIG. 7 performs 3 major functions:

Managed Sales & Marketing: Partnerships and access to major U.S. online retailers with support for product marketing, pricing and merchandising.

Inventory & Order Management: Automated inventory and order management. Real-time sales and analytics dashboards. SaaS cloud-based technology integration with all retailer systems.

3PL Full-Service Fulfillment: Warehousing storage and fulfillment. Volume-based shipping discounts. Minimal operational overhead costs.

FIG. 8 shows in more details the operations of FIG. 7. In one example:

Manufacturer upload products information to System Network (Portal)

Manufacturer log into System portal and search for lowest cost Ocean Freight Carrier to ship and automatically clear customs when Freight arrives in port and deliver to logistic fulfillment warehouse System matches online line retailer with competitive wholesale pricing that wants to sell it's product through automatic proposal or through their portal System using its Content Delivery partners to upload product information to retailer's sight or a virtual catalog instore with 3D or a monitor.

Manufacturer sets marketing and affiliating budget for digital marketing for their products End Consumer orders a product, System will manage the inventory and order lifecycle and sends the orders to fulfillment center closes to the consumer home address and find the lowest cost last mile delivery service to fulfill the order.

End consumer decides to return the order, log into System portal or through online retailer, System will generate automatic return label and decide with reverse logistic warehouse to send to with the lowest costs.

Manufacturer reviews reports and demand forecasting of their products to plan for next shipment.

System connects payment and financials services to improve cashflow and cross border payment with domestic and foreign banks.

All integrations are done by EDI/API and machine learning rules to route orders, pricing, and design to reduce cost of product delivery, lower barrier of entry to commerce.

In the example of FIG. 9, a system helps brands easily sell into major online retail platforms with fulfillment, sales channel and operation software support. The system helps remote or offshore manufacturers to discover major online retailers. Dropshipping is supported:
  Online Retailers doesn't hold inventory
  Orders are sent directly to the Supplier to fulfill
  Supplier ship the product to the end customer In this system, a customer pays for a widget on-line at one or more online retailers such as Walmart, Wayfair, Overstock, or Home Depot, for example. The online retailer forwards the order to a supplier and pay a predetermined discounted price to the supplier for the widget. The supplier or brand sends an order to a manufacturer who produces the widget and ships the widget to a warehouse. The warehouse ships the product to the customer and the order is closed.

The system avoids Expensive IT systems to manage the supply chain and automation, High paid sales reps to connect with retailers & localization of products. The remote manufacturer does not have to deal with local dropshipping and eCommerce operation knowledge and large outlays and commitment on warehouses and fulfillment. The consumer has access to global pricing in a convenient manner.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback and input from the user may be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital image capture devices and associated interpretation software, and the like.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it is used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." In addition, use of the term "based on," above and in the claims is intended to mean, "based at least in part on," such that an unrecited feature or element is also permissible.

Non-transitory computer program products (i.e., physically embodied computer program products) are also described that store instructions, which when executed by one or more data processors of one or more computing systems, causes at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including but not limited to a connection over a network (e.g. the Internet, a wireless wide area network, a local area network, a wide area network, a wired network, or the like), via a direct connection between one or more of the multiple computing systems, etc.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A method for responding to an order for a product from a customer located in a customer country, comprising:
    receiving at a processor product data from a plurality of manufacturers outside of the customer country;
    matching the manufacturers with at least a retailer to sell the product;
    automatically uploading manufacturer data to a retailer computer including images and dimension data for each product;
    training, by the processor, a machine learning model to recommend products for each product type including brands, styles, and sizes customized to customer environments and based on a reference image provided by the customer, wherein the machine learning model includes a generator and a discriminator where the generator generates a first product image from a second product image and the discriminator distinguishes between the first and second product images from the generator;
    running the machine learning model based on images from the customer and recommending one or more products to the customer;
    receiving, at the processor, a customer order for the product specified using a computer or a smartphone of the customer;
    extracting, by the processor, order information from the customer order comprising a geographic location of the customer and mailing address;
    recommending one or more products by the machine learning model for the customer from the received images and order information;
    generating one or more product images based on the recommended one or more products;
    receiving an order for the recommended one or more products and sending the order to the manufacturer located outside of the customer country and managing production for the manufacturer through a dashboard populated with a forecasted demand;
    managing delivery logistics by the processor by matching available truckers and warehouses based on proximity;
    in response to an order return, generating by the processor a return label and determining a reverse logistic warehouse to receive the product for return; and wherein:
    uploading by the manufacturer product information to the server;
    searching for a predetermined freight carrier to ship and clear customs when freight arrives in port and deliver to logistic fulfillment warehouse;
    matching the manufacturer with an online retailer that wants to sell product with wholesale pricing through an automatic proposal or through a portal and wherein the manufacturer sets marketing and affiliating budget for digital marketing for products; and
    retraining the machine learning model with additional first and second images to optimize a recommendation accuracy.

2. The method of claim 1, wherein the machine learning model comprises one of: one or more neural network, supervised learning network, unsupervised learning network, or reinforcement learning network.

3. The method of claim 1, comprising managing sales process using the one or more neural networks.

4. The method of claim 1, comprising managing inventory by forecasting one or more local demands and moving the product close to the one or more local demands.

5. The method of claim 1, comprising managing shipping based on forecasted demand.

6. The method of claim 1, comprising managing production based on forecasted demand.

7. The method of claim 1, comprising uploading product data to a seller or retailer.

8. The method of claim 1, comprising mapping product data to third party product data.

9. The method of claim 1, comprising mapping product to a retailer SKU.

10. The method of claim 1, comprising managing digital assets.

11. The method of claim 1, comprising providing a marketplace exchange matching manufacturers to retailers.

12. The method of claim 1, wherein the a first country comprises an ASEAN country or an African country.

13. The method of claim 1, wherein the a second country comprises one of: European Union, United States, Japan, Korea, China.

14. The method of claim 1, comprising supporting a remote or offshore supplier with drop shipping where online retailers hold no inventory and the supplier ships the product to the customer, where the customer pays for a product at one or more online retailers that forward the order to the supplier and pay a predetermined discounted price to the supplier for the product.

15. The method of claim 1, wherein the supplier sends an order to a manufacturer who produces the product and ships the product to the customer.

* * * * *